(12) United States Patent
Lazaridis et al.

(10) Patent No.: US 9,058,077 B2
(45) Date of Patent: Jun. 16, 2015

(54) TACTILE TOUCH SCREEN FOR ELECTRONIC DEVICE

(75) Inventors: Mihal Lazaridis, Waterloo (CA); Jason Griffin, Kitchener (CA); Norman Ladouceur, Waterloo (CA)

(73) Assignee: BLACKBERRY LIMITED, Waterloo (CA)

(*) Notice: Subject to any disclaimer, the term of this patent is extended or adjusted under 35 U.S.C. 154(b) by 2251 days.

(21) Appl. No.: 11/941,774

(22) Filed: Nov. 16, 2007

(65) Prior Publication Data

US 2009/0128501 A1 May 21, 2009

(51) Int. Cl.
*G06F 3/041* (2006.01)

(52) U.S. Cl.
CPC .................... *G06F 3/0414* (2013.01)

(58) Field of Classification Search
CPC ..... G06F 3/041; G06F 3/0412; G06F 3/0414; G06F 3/0416; G06F 3/0418
USPC ...................... 345/173–178; 178/18.01–18.11
See application file for complete search history.

(56) References Cited

U.S. PATENT DOCUMENTS

| | | | |
|---|---|---|---|
| 5,736,703 A * | 4/1998 | Kim ............................. 200/1 B |
| 6,724,370 B2 | 4/2004 | Dutta et al. | |
| 2001/0035854 A1 | 11/2001 | Rosenberg et al. | |
| 2002/0033795 A1 | 3/2002 | Shahoian et al. | |
| 2002/0173344 A1 | 11/2002 | Cupps et al. | |
| 2004/0108995 A1 | 6/2004 | Hoshino et al. | |
| 2006/0119586 A1 | 6/2006 | Grant et al. | |
| 2006/0181517 A1 | 8/2006 | Zadesky et al. | |
| 2006/0197753 A1 | 9/2006 | Hotelling | |
| 2007/0247429 A1 | 10/2007 | Westerman | |

FOREIGN PATENT DOCUMENTS

| | | |
|---|---|---|
| CN | 1818840 A1 | 8/2006 |
| EP | 1450247 A1 | 8/2004 |
| EP | 1691263 A1 | 8/2006 |
| GB | 2402105 A | 12/2004 |
| JP | 9-62448 A | 3/1997 |
| JP | 2003-196026 A | 7/2003 |

(Continued)

OTHER PUBLICATIONS

European Application No. 07120938.1 Search Report dated Apr. 10, 2008.

(Continued)

*Primary Examiner* — Jimmy H Nguyen
(74) *Attorney, Agent, or Firm* — Geoffrey deKleine; Borden Ladner Gervais LLP

(57) ABSTRACT

An electronic device includes a base, a touch screen display, a pair of switches and operational components. The touch screen display is connected to the base, movable relative thereto and includes a display device and a touch-sensitive input surface overlying the display device. A pair of switches disposed between the base and the touch screen display and configured such that one of the switches is actuated in response to application of a force anywhere on the touch-sensitive input surface of the touch screen display and both of the switches are actuated in response to application of more than one force on the touch-sensitive input surface of the touch screen display. The operational components include a controller connected to the touch-sensitive input surface and a processor connected to the controller and the display.

28 Claims, 6 Drawing Sheets

(56) References Cited

FOREIGN PATENT DOCUMENTS

| JP | 2004-94389 | A | 3/2004 |
| WO | 2004107146 | A2 | 12/2004 |
| WO | 2006/035966 | A1 | 4/2006 |
| WO | 2006/088499 | A1 | 8/2006 |

OTHER PUBLICATIONS

Examination Report, European Patent Application No. 07120938.1 dated Jun. 25, 2008.
JP Office Action dated Oct. 22, 2010 issued from the corresponding JP patent application.
English Translation of Chinese Patent Application No. 2100810178248.1, dated May 12, 2010.
JP Office Action dated Jul. 7, 2011 issued from the corresponding JP patent application No. 2008-282187.
Official Action dated Oct. 9, 2013 and translation thereof, issued in corresponding Taiwanese patent application 097142703.
Office Action dated Nov. 30, 2012, issued in respect of corresponding Taiwan Patent Application No. 097142703.
Office Action dated Sep. 20, 2013, issued in respect of corresponding European Patent Application No. 09177536.1.

* cited by examiner

TACTILE TOUCH SCREEN FOR ELECTRONIC DEVICE

FIELD OF TECHNOLOGY

The present application relates to input and output devices for portable electronic devices.

BACKGROUND

Portable electronic devices have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and easy portability. Smaller devices are generally desirable for portability. A touch screen input/output device is particularly useful on such handheld devices as such handheld devices are small and are therefore limited in space available for user input and output devices. Further, the screen content on the touch screen input/output devices can be modified depending on the functions and operations being performed.

Touch screen input/output devices are constructed of a display, such as a liquid crystal display, with a touch-sensitive overlay. These input/output devices suffer from inherent disadvantages relating to user interaction and response, however. In particular, such touch screen input/output devices fail to provide a user-desirable tactile feedback for positively indicating input, providing a poor user-experience.

Improvements in input/output devices are therefore desirable.

BRIEF DESCRIPTION OF THE DRAWINGS

Embodiments of the present application will now be described, by way of example only, with reference to the attached Figures, wherein.

DETAILED DESCRIPTION

Figure 1:
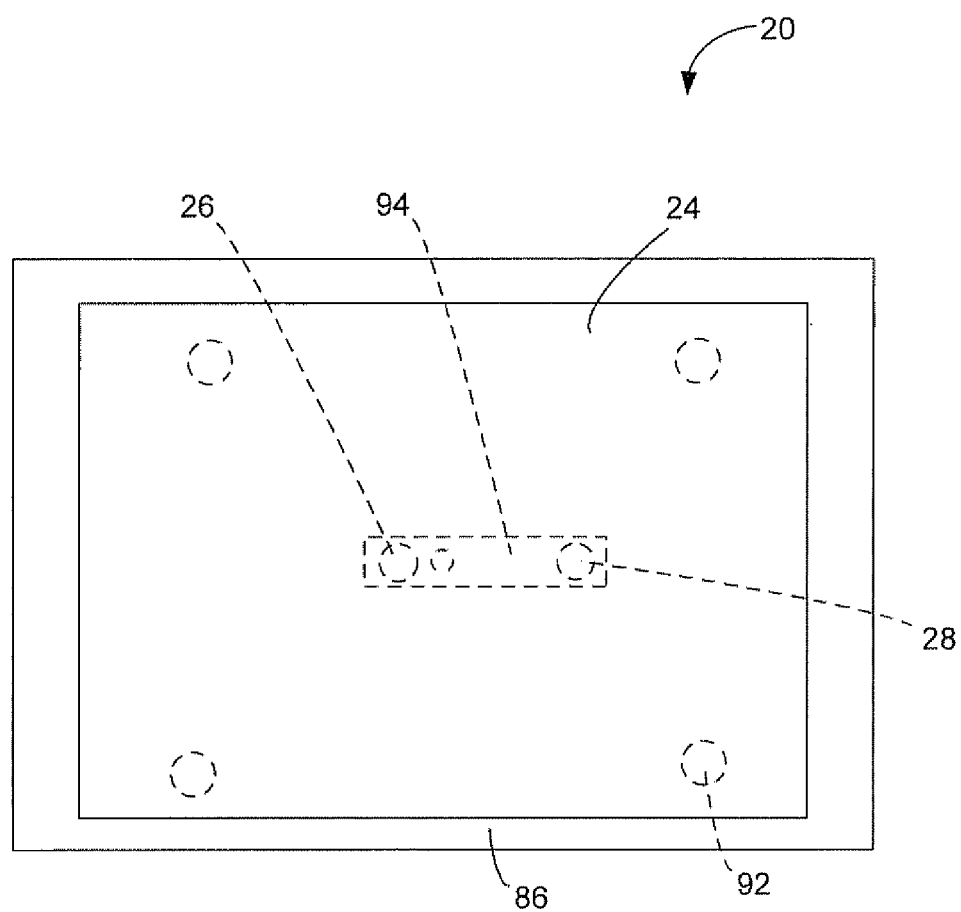
FIG. 1 is a top view of a portable electronic device according to one embodiment, with certain hidden features shown in ghost outline for the purpose of illustration.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It will be understood that the exemplary views, particularly those shown in FIGS. 2 and 4 to 11 are not scale and are provided for the purpose of explanation and understanding.

The embodiments described herein generally relate to a portable electronic device having a display. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 2:
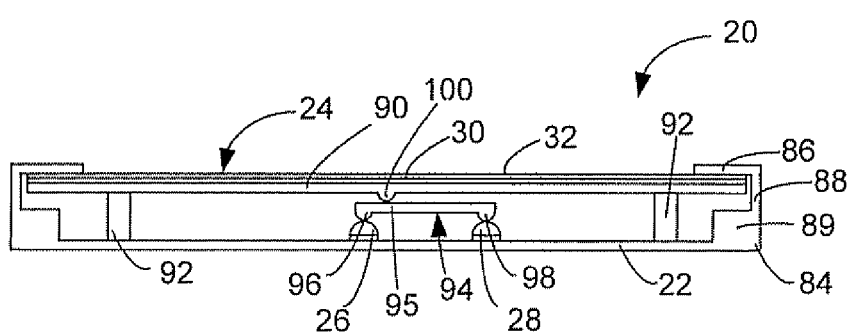
FIG. 2 is a simplified sectional side view of the portable electronic device of FIG. 1 (not to scale)
Figure 3:
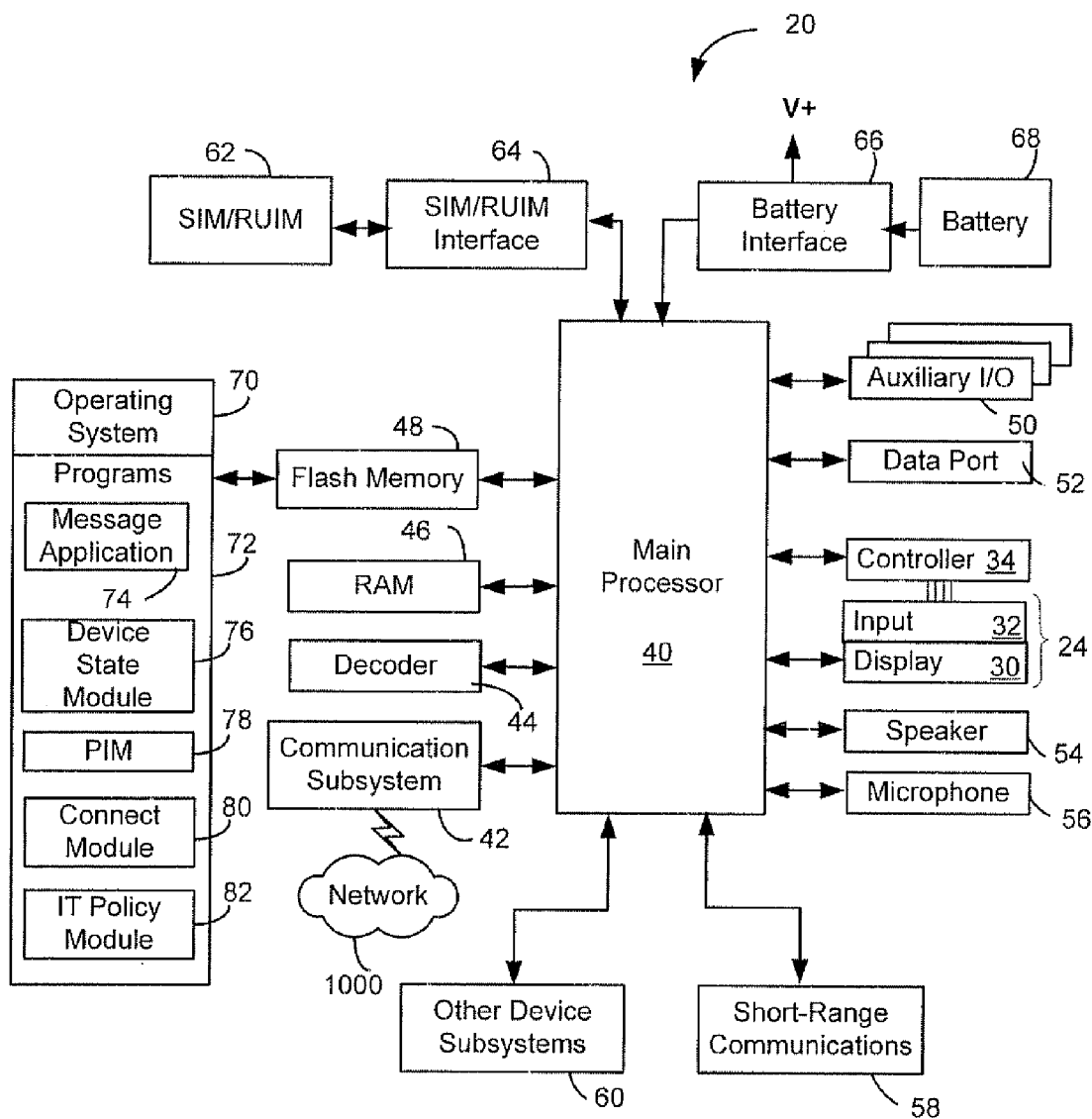
FIG. 3 is a block diagram of certain components, including certain internal components, of the portable electronic device of FIG. 1.

Referring to FIGS. 1 to 3, an electronic device, which in the present embodiment is a portable electronic device, is indicated generally by the numeral 20. The portable electronic device 20 includes a base 22, a touch screen display 24, a pair of switches 26, 28 and operational components (best shown in FIG. 3). The touch screen display 24 is connected to the base 22, movable relative thereto and includes a display device 30 and a touch-sensitive input surface 32 overlying the display device 30. The switches 26, 28 are disposed between the base 22 and the touch screen display 24 and configured such that one of the switches 26 is actuated in response to application of a force anywhere on the touch-sensitive input surface 32 of the touch screen display 24 and both of the switches 26, 28 are actuated in response to application of more than one force on the touch-sensitive input surface 32 of the touch screen display 24. The operational components include a controller 34 connected to the touch-sensitive input surface 32 and a processor 40 connected to the controller 34 and the touch screen display 24.

Referring now to FIG. 3, there is shown therein a block diagram of an exemplary embodiment of a portable electronic device 20. The portable electronic device 20 includes a number of components such as the processor 40 that controls the overall operation of the portable electronic device 20. Communication functions, including data and voice communications, are performed through a communication subsystem 42. Data received by the portable electronic device 20 can be decompressed and decrypted by decoder 44, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 42 receives messages from and sends messages to a wireless network 1000. In this exemplary embodiment of the portable electronic device 20, the communication subsystem 42 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 42 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 40 also interacts with additional subsystems such as a Random Access Memory (RAM) 46, a flash memory 48, the display device 30 with the input surface 32, an auxiliary input/output (I/O) subsystem 50, a data port 52, a speaker 54, a microphone 56, short-range communications 58 and other device subsystems 60.

Some of the subsystems of the portable electronic device 20 perform communication-related functions, whereas other subsystems may provide "resident" or on-device functions. By way of example, the display 30 and the input surface may be used for both communication-related functions, such as entering a text message for transmission over the network 1000, and device-resident functions such as a calculator or task list.

The portable electronic device 20 can send and receive communication signals over the wireless network 1000 after network registration or actuation procedures have been completed. Network access is associated with a subscriber or user of the portable electronic device 20. To identify a subscriber according to the present embodiment, the portable electronic device 20 uses a SIM/RUIM card 62 (i.e. Subscriber Identity Module or a Removable User Identity Module) to be inserted into a SIM/RUIM interface 64 in order to communicate with a network. The SIM/RUIM card 62 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM card 62. By inserting the SIM/RUIM card 62 into the SIM/RUIM interface 64, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 62 includes a processor and memory for storing information. Once the SIM/RUIM card 62 is inserted into the SIM/RUIM interface 64, it is coupled to the processor 40. In order to identify the subscriber, the SIM card/RUIM 62 can include some user parameters such as an International Mobile Subscriber Identity (IMSI). An advantage of using the SIM/RUIM card 62 is that a subscriber is not necessarily bound by any single physical portable electronic device. The SIM/RUIM card 62 may store additional subscriber information for a portable electronic device as well, including datebook (or calendar) information and recent call information. Alternatively, user identification information can also be programmed into the flash memory 48.

The portable electronic device 20 is a battery-powered device and includes a battery interface 66 for receiving one or more rechargeable batteries 68. In at least some embodiments, the battery 68 can be a smart battery with an embedded microprocessor. The battery interface 66 is coupled to a regulator (not shown), which assists the battery 68 in providing power V+ to the portable electronic device 20. Although current technology makes use of a battery, future technologies such as micro fuel cells may provide the power to the portable electronic device 20.

The portable electronic device 20 also includes an operating system 70 and software components 72 to 82 which are described in more detail below. The operating system 70 and the software components 72 to 82 that are executed by the processor 40 are typically stored in a persistent store such as the flash memory 48, which may alternatively be a read-only memory (ROM) or similar storage element (not shown). Those skilled in the art will appreciate that portions of the operating system 70 and the software components 72 to 82, such as specific device applications, or parts thereof, may be temporarily loaded into a volatile store such as the RAM 46. Other software components can also be included, as is well known to those skilled in the art.

The subset of software applications 72 that control basic device operations, including data and voice communication applications, will normally be installed on the portable electronic device 20 during its manufacture. Other software applications include a message application 74 that can be any suitable software program that allows a user of the portable electronic device 20 to send and receive electronic messages. Various alternatives exist for the message application 74 as is well known to those skilled in the art. Messages that have been sent or received by the user are typically stored in the flash memory 48 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 76, a Personal Information Manager (PIM) 78, and other suitable modules (not shown). The device state module 76 provides persistence, i.e. the device state module 76 ensures that important device data is stored in persistent memory, such as the flash memory 48, so that the data is not lost when the portable electronic device 20 is turned off or loses power.

The PIM 78 includes functionality for organizing and managing data items of interest to the user, such as, but not limited to, e-mail, contacts, calendar events, voice mails, appointments, and task items. A PIM application has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 80, and an information technology (IT) policy module 82. The connect module 80 implements the communication protocols that are required for the portable electronic device 20 to communicate with the wireless infrastructure and any host system, such as an enterprise system, that the portable electronic device 20 is authorized to interface with.

The connect module 80 includes a set of APIs that can be integrated with the portable electronic device 20 to allow the portable electronic device 20 to use any number of services associated with the enterprise system. The connect module 80 allows the portable electronic device 20 to establish an end-to-end secure, authenticated communication pipe with the host system. A subset of applications for which access is provided by the connect module 80 can be used to pass IT policy commands from the host system to the portable electronic device 20. This can be done in a wireless or wired manner. These instructions can then be passed to the IT policy module 82 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 50, the data port 52, the short-range communications subsystem 58, or any other suitable device subsystem 60. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 52 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 52 can be any suitable port that enables data communication between the portable electronic device 20 and another computing device. The data port 52 can be a serial or a parallel port. In some instances, the data port 52 can be a USB port that includes data lines for data transfer and a supply line that can provide a charging current to charge the battery 68 of the portable electronic device 20.

The short-range communications subsystem 58 provides for communication between the portable electronic device 20 and different systems or devices, without the use of the wireless network 1000. For example, the subsystem 58 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 42 and input to the processor 40. The processor 40 then processes the received signal for output to the display 30 or alternatively to the auxiliary I/O subsystem 50. A subscriber may also compose data items, such as e-mail messages, for example, using the input surface 32 in conjunction with the display 30 and possibly the auxiliary I/O subsystem 50. The auxiliary subsystem 50 may include devices such as: a mouse, track ball, infrared fingerprint detector, or a roller wheel with dynamic button pressing capability. A keyboard can also be provided, such as an alphanumeric keyboard and/or telephone-type keypad. A composed item may be transmitted over the wireless network 1000 through the communication subsystem 42.

For voice communications, the overall operation of the portable electronic device 20 is substantially similar, except that the received signals are output to the speaker 54, and signals for transmission are generated by the microphone 56. Alternative voice or audio I/O subsystems, such as a voice message recording subsystem, can also be implemented on the portable electronic device 20. Although voice or audio signal output is accomplished primarily through the speaker 54, the display 28 can also be used to provide additional information such as the identity of a calling party, duration of a voice call, or other voice call related information.

Referring again to FIGS. 1 and 2, the base 22 is part of a housing 84 that also includes a frame 86 spaced from the base 22 and framing the touch screen display 24. Sidewalls 88 extend between the base 22 and the frame 86. The housing 84 includes a display stop 89 that extends from the base 22 towards the touch screen display 24 and inwardly from the sidewalls 88 for limiting the amount of displacement of the touch screen display 24 towards the base 22. Thus, the display stop 89 is formed by a step projecting from the base 22. It will be appreciated, however, that the display stop 89 can be any suitable stop for limiting the displacement of the touch screen display 24. According to the present embodiment, the sidewalls 88 extend generally perpendicular to the base 22 and the frame 86. The base 22 includes a plate (not shown) that is releasably attached for insertion and removal of, for example, the battery 68 and the SIM/RUIM card 62 described above. It will be appreciated that the base 22, the sidewalls 88, the frame 86 and the display stop 89 can be injection molded, for example. The frame 86 is sized and shaped to frame a window in which the touch screen display 24 is exposed for input by user contact with the input surface 32 of the touch screen display 24 and for displaying output on the display device 30. The touch screen display 24 is biased towards the frame 86, as shown in FIG. 2 and the frame 86 maintains the touch screen display 24 within the housing 84. Thus, the touch screen display 24 is moveable within and constrained by the housing 84. It is contemplated that the edges of the touch screen display 24 can be supported by an edge support that surrounds the edges and thus, the touch screen display 24 is biased such that the edge support contacts the frame 86 of the housing 84. According to the embodiment shown in FIG. 1, the frame 86 is generally rectangular although other shapes are possible. For example, the corners of the frame 86 can be rounded.

The touch screen display 24 is supported by a rigid display support 90 to provide structural support to the touch screen display 24 and inhibit bending causing damage or breaking of the touch screen display 24. The display support 90 can be formed of any suitable material and can include further functional components such as a printed circuit board. It will be appreciated that the touch screen display 24 is an assembly of components including, the touch-sensitive input surface 32 overlying the LCD display device 30 and other components including optional components such as a backlight (not shown). The touch screen display 24 is biased away from the base 22 of the housing 84, toward the frame 86 by biasing elements 92 such that the edges of the touch screen display 24 are in contact with the underside of the frame 86. According to the present embodiment, four biasing elements 92 are located between the base 22 and the touch screen display 24, each biasing element 92 being located near a respective corner of the touch screen display 24. Each of the four biasing elements 92 contact the display support 90. The biasing elements 92 are made of a suitable material such as foam that, with the application of a suitable force to the touch screen display 24, permits movement of the touch screen display 24 within the housing 84. The biasing elements 92 are not limited to foam as any suitable biasing element such as a leaf spring or springs, coil spring or springs, rubber, gel or any other suitable biasing element can be employed. It will be appreciated that other numbers of biasing elements 92 can be used and, in fact, the biasing element can be, for example, a continuous element that extends around, proximal the periphery of the touch screen display 24. The biasing element or elements provide a spring-like force to bias the touch screen display 24 away from the base 22, toward the frame 86. Further, the touch screen display 24 can be biased by the switches 26, 28 rather than employing the biasing elements 92.

Also located between the touch screen display 24 and the base 22 of the housing 84 is the pair of switches 26, 28. In the present embodiment, the switches 26, 28 are dome-type switches, however, the switches 26, 28 can be any suitable mechanical switches. The switches 26, 28 are spaced apart laterally with one switch 26 located closer to the protrusion 100 at the center of the touch screen display 24 than the other switch 28. As shown, the switch 26 is located proximal the center of the touch screen display 24 and the other switch 28 is spaced a greater distance from the center. The switches 26, 28 are depressed (or actuated) by an actuator 94 that is located between the switches 26, 28 and the touch screen display 24. The actuator 94 includes a beam 95 and a pair of spaced apart projections 96, 98, each of which extends at a respective end of the beam 95, toward the base 22, into contact with a respective one of the spaced apart switches 26, 28. It will be appreciated that the actuator 94 extends between the switches 26, 28 which are not equidistant from the center of the touch screen display 24 and therefore the actuator 94 is not centered in relation to the touch screen display 24. A protrusion 100 extends from the display support 90 from a point generally centered on the touch screen display 24, towards the base 22 and into contact with the actuator 94. Since the protrusion 100 extends from the center of the touch screen display 24 into contact with the actuator 94, which is not centered in relation to the touch screen display 24, the protrusion 100 contacts the actuator 94 at a point spaced from the center of the length of the beam 95. Thus, displacement of the touch screen display 24 resulting from a user pressing the touch screen display 24, causes displacement of the actuator 94 which actuates (depresses) at least one of the switches 26, 28. A user pressing at a first location on the touch screen display 24 causes displacement of the touch screen display 24 and actuation of the one of the switches 26 that is closest to the center of the touch screen display 24. The displacement of the touch screen display 24 is limited by the display stop 89 as the edge of the touch screen display 24 abuts the display stop 89 on the side of the touch screen display 24 that the user presses on. A user pressing at a second location on the touch screen display 24 while still pressing at the first location on the touch screen display 24 causes further displacement of the touch screen display 24 and actuation of the other switch 28. Again, the displacement of the touch screen display 24 is limited by the display stop 89. In the present embodiment, the protrusion 100 is a rounded protrusion that extends from the display support 90. It will be appreciated, however, that the protrusion 100 can be any suitable shape and can be formed as part of the actuator 94, extending from the beam 95, on the opposite side as the projections 96, 98 for contact with the display support 90, rather than formed on the display support 90.

Figure 5:
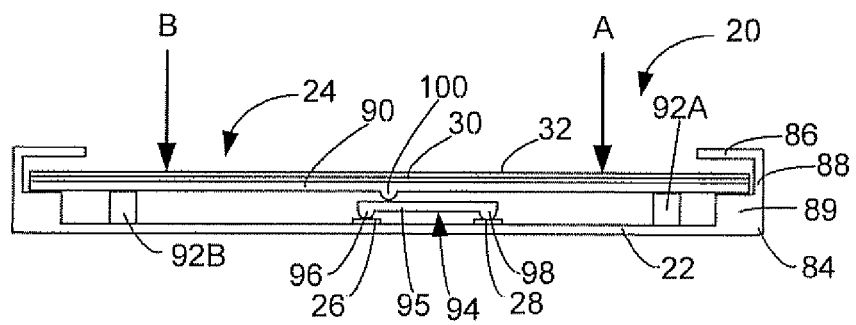
FIG. 5 is a simplified sectional side view of the portable electronic device of FIG. 1 (not to scale), showing forces applied to locations on the touch screen display.

Thus, user application of a force at a first location anywhere on the touch-sensitive surface 32 of the touch screen display 24, causes depression of one of the switch 26, thereby providing the user with positive tactile feedback during user interaction with the user interface of the portable electronic device 20. Further, user application of a force at a second location of the touch screen display 24 while maintaining application of the force at the first location of the touch screen display, causes depression of the other switch 28, thereby providing the user with positive tactile feedback. Thus, both switches 26, 28 are depressed, as shown in FIG. 5.

The components including the processor 40 and other components described above with reference to FIG. 3 are housed within the housing 84 to provide the functionality of the portable electronic device 22.

As indicated above, the touch screen display 24 includes the display device 30 and the touch-sensitive input surface 32 overlying the display device 30 for providing a graphical user interface for user-input. The touch screen display 24 generates signals when a user touches the touch screen display 24 or slides a finger along the touch screen display 24, resulting in the initiation of commands at the processor 40. The touch screen display 24 provides a graphical user interface for user interaction. Thus, the display device 30 provides graphical representations that are selectable or manipulatable by user interaction with the touch-sensitive input surface 32 of the touch screen display 24.

The switches 26, 28 can provide further input as actuation of either the one switch 26 by user application of a sufficient force or both of the switches 26, 28 by user application of sufficient forces can generate a further signal or signals input to the processor 40. The further signals from the actuation of the mechanical switches 26, 28 can cause the initiation of commands at the processor 40, either alone or resulting from the combination of the signal or signals from the mechanical switches 26, 28 and signals from the touch sensitive input surface 32. Thus, commands initiated at the processor 40 can be a result of the signals from the touch sensitive input surface 32 or a result of the combination of the signals from the touch sensitive input surface with signals from either or both of the mechanical switches 26, 28 caused by user interaction. User interaction can be, for example, the user touching the touch screen display 24 or the user sliding a finger along the touch screen display 24. Different sliding actions of the finger along the touch screen display 24 can also result in different commands initiated at the processor 40.

It will also be appreciated that the user of the portable electronic device 20 can cause commands to be initiated at the processor 40 of the device by user interaction with the touch screen display 24 without actuating the switch 26, and therefore without actuating the switch 28. For example, the user can touch or slide a finger along the touch screen display causing the generation of signals and the initiation of commands without applying sufficient force to cause depression of the switch 26.

Figure 4:
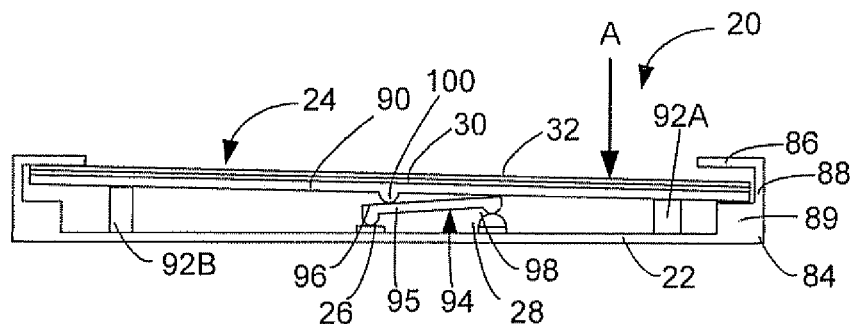
FIG. 4 is a simplified sectional side view of the portable electronic device of FIG. 1 (not to scale), showing a force applied to a point on a touch screen display.
Figure 6:
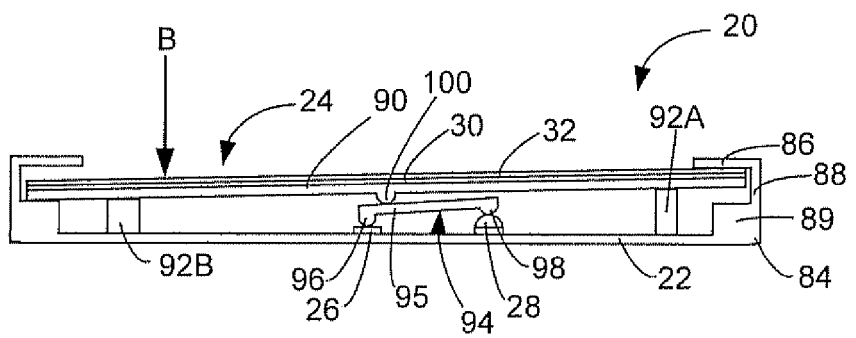
FIG. 6 is a simplified section side view of the portable electronic device of FIG. 1 (not to scale), showing a force applied to another location on the touch screen display.

Reference is now made to FIGS. 4 to 6 to describe movement of the touch screen display 24 within the housing 84 of the portable electronic device 20. Referring first to FIG. 4, there is shown a simplified sectional side view of the portable electronic device 20 according to one exemplary embodiment in which a force is applied by, for example, a user pressing a finger on the touch-sensitive input surface 32 of the touch screen display 24, in the direction of the arrow "A". As shown, the user presses on the touch screen display 24, resulting in pivoting of the touch screen display 24 such that the biasing elements 92A that are on the same side of the portable electronic device 20 at which the force is applied to the touch screen display 24 are compressed more than the biasing elements 92B that are on the opposite side of the center of the portable electronic device 20. It will be appreciated from the Figure that when a force is applied on the touch screen display 24, the touch screen display 24 pivots against the underside of the frame 86, along an edge on the opposite side of the portable electronic device 20. In the example of FIG. 4, the biasing elements 92A on the right-hand side of the portable electronic device are compressed more than the biasing elements 92B shown on the left hand side of the portable electronic device 20 as the force is applied to the right-hand side of the touch screen display 24. Displacement of the touch screen display 24 toward the base 22 is limited by the display stop 89.

With the displacement of the touch screen display 24 caused by application of sufficient force to the touch screen display 24, the protrusion 100 from the display support 90 is displaced and causes displacement of the actuator 94, resulting in displacement of the actuator 94 and the projection 96 depressing the switch 26, as shown in FIG. 4. Thus, the switch 26 is actuated.

Referring now to FIG. 5, a second force is applied by, for example, a user pressing a second finger on the touch-sensitive input surface 32 of the touch screen display 24, in the direction of the arrow "B", while still pressing the first finger on the touch-sensitive input surface 32 of the touch screen display 24, in the direction of the arrow "A" as described with reference to FIG. 4. As shown, the user presses on the touch screen display 24, resulting in pivoting of the touch screen display 24 such that the biasing elements 92B on the other side of the portable electronic device 20 are further compressed. It will be appreciated from the Figure that with the application of a second force, the touch screen display 24 pivots along an edge, against the display stop 89 on the side of the portable electronic device 20 at which the first force was applied. In the example of FIG. 5, the biasing elements 92B on the left-hand side of the portable electronic device 20 are further compressed as the touch screen display 24 pivots against the display stop 89 on the right-hand side of the portable electronic device 20. Again, displacement of the touch screen display 24 toward the base 22 is limited by the display stop 89.

With the displacement of the touch-screen display 24 caused by application of sufficient force to the touch screen display 24, the protrusion 100 from the display support 90 is displaced and causes displacement of the actuator 94, resulting in the projection 98 depressing the switch 28, as shown in FIG. 5. Thus, the switch 28 is also actuated. As shown, both switches 26, 28 are depressed. It will be appreciated that the application of the second force "B" need not be on the opposite side of the center of the touch screen display 24 to depress the switch 28 as a second force on the same side of the touch screen display 24 as the first force "A" also causes further displacement of the touch screen display 24 resulting in depression of the switch 28. It will be appreciated that when one side of the touch screen display 24 is displaced a maximum distance of d, as shown in FIGS. 4 and 6, the center of the touch screen display 24 and thus the protrusion 100 is displaced a distance of d/2, resulting in the depression of the switch 26. When two forces are applied causing both sides of the touch screen display 24 to be displaced a maximum distance of d, the center of the touch screen display 24 and the protrusion 100 is displaced a distance of d, resulting in depression of both switches 26, 28.

Referring now to FIG. 6, there is shown a simplified sectional side view of the portable electronic device 20, according to an example in which a force is applied by, for example, a user pressing a finger on the touch-sensitive input surface 32 of the touch screen display 24, in the direction of the arrow "B". As shown, the user presses on the touch screen display 24, resulting in pivoting of the touch screen display 24 such that the biasing elements 92B that are on the side of the portable electronic device 20 at which the force is applied to the touch screen display 24 are compressed more than the biasing elements 92A that are on the opposite side of the portable electronic device 20. It will be appreciated from the Figure that when a force is applied on one side of the touch screen display 24, the touch screen display 24 pivots along an edge against the underside of the frame 86 on the opposite side of the portable electronic device 20. In the example of FIG. 6, the biasing elements 92B on the left-hand side of the portable electronic device are compressed more than the biasing elements 92A shown on the right hand side of the portable electronic device 20 as the force is applied to the left-hand side of the touch screen display 24. Displacement of the touch screen display 24 toward the base 22 is limited by the display stop 89.

With the displacement of the touch screen display 24 caused by application of sufficient force thereto, the protrusion 100 from the display support 90 is displaced and causes displacement of the actuator 94, resulting in depression of the switch 26 by the projection 96, as shown in FIG. 6. Thus, the switch 26 is actuated.

Application of a second force by, for example, a user pressing a second finger into the touch screen display 24 results in pivoting of the touch screen display 24 such that the biasing elements 92A on the other side of the portable electronic device 20 are compressed as the touch screen display 24 pivots along an edge, against the display stop 89 on the side of the portable electronic device 20 at which the first force was applied. With the displacement of the touch screen display 24 caused by application of sufficient force thereto, displacement of the protrusion 100 causes displacement of the actuator 94, resulting in the projection 98 depressing the switch 28, as shown, for example, in FIG. 5. Thus, the switch 28 is actuated. Again, both switches 26, 28 are depressed.

It will be appreciated that the removal of one applied force by, for example, the user lifting one of the two fingers from the touch screen display 24 results in the pivoting of the touch screen display 24 to the position shown in FIG. 4 or FIG. 6, depending on which side of the touch screen display 24 the remaining force is applied. The switch 28 that is farthest from the centre of the touch screen display 24 also returns to the original position. Thus, with the removal of one of the two forces on the touch screen display 24, the switch 28 returns to the original position. It will also be appreciated that the removal of both applied forces by, for example, the user lifting both fingers from the touch screen display 24 results in the touch screen display 24 returning to the position shown in FIG. 2 in which the touch screen display 24 is biased away from the base 22 into contact with the frame 86. Both switches 26, 28 also return to the original position shown in FIG. 2.

Thus, when a virtual keyboard, for example, is displayed on the touch screen display 24 of the portable electronic device 20, a user can select characters by pressing on the touch screen display 24 using, for example, the thumbs in a similar manner to thumb typing on a mechanical keyboard of a portable electronic device. The switches 26, 28 provide desirable tactile feedback for the user when typing on the virtual keyboard displayed on the touch screen display 24. When typing multiple characters, depression of the touch screen display 24 with, for example, a thumb to select a character may occur prior to lifting the opposite thumb from selection of a previous character on the touch screen display 24. Thus, there is an overlap in time during which both thumbs contact and depress the touch screen display 24. The pair of switches 26, 28 provide the user with tactile feedback when depressing the touch screen display to select a character even when the touch screen display is still depressed from selection of a previous character. Further, tactile feedback can be provided when lifting either or both thumbs from the touch screen display 24.

Figure 7:
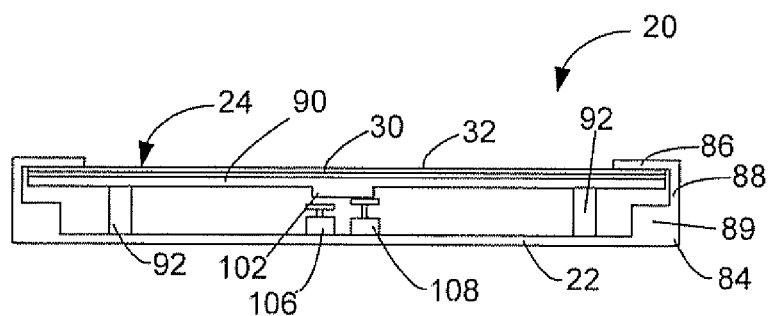
FIG. 7 is a simplified sectional side view of a portable electronic device according another embodiment (not to scale)

Reference is now made to FIG. 7 to describe another embodiment of the present application. According to the present embodiment, two spaced apart, a generally rectangular protrusion 102 extends from the display support 90 in the direction of the base 22. A pair of switches 106, 108 are located proximal the center of the touch-screen display 24. The protrusion 102 extends from a center of the touch screen display and is in contact with one switch 108. The other switch 106 is spaced from the protrusion 102 such that displacement of the touch screen display 24 results in actuation of the switch 108 before actuation of the switch 106 and actuation of the switch 106 requires greater displacement of the center of the touch screen display 24. The switch 108 allows for over-travel after actuation such that the touch screen display 24 can be further displaced to cause actuation of the switch 106. The switches 106, 108 can be any suitable type of mechanical switches. Thus, there is no actuator in the present embodiment. Instead, the protrusion 102 that extends from the display support 90 contacts and actuates the switches 106, 108. Thus, when a force is applied by, for example, a user pressing on the touch screen display 24, the touch screen display 24 is displaced and the protrusion 102 depresses the switch 108. Further, when a second force is applied to the touch screen display 24 while the first force is still applied, the touch screen display 24 pivots against the display stop 89 and the protrusion 102 depresses the other switch 106. Thus, both switches 106, 108 are depressed.

Figure 8:
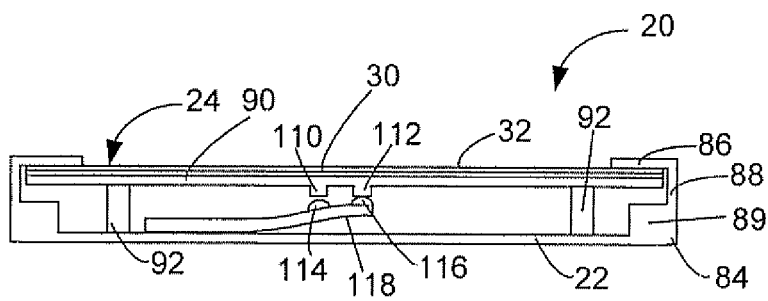
FIG. 8 is a simplified sectional side view of a portable electronic device according another embodiment (not to scale)

Referring now to FIG. 8, still another embodiment of the present application is shown. As in the embodiment described with reference to FIG. 9, there is no actuator between the base 22 and the touch screen display 24. According to the present embodiment, two spaced apart, generally rectangular protrusions 110, 112 extend from the display support 90 in the direction of the base 22. It will be appreciated that rather than two rectangular protrusions, a single protrusion can extend from the display support 90. The two spaced apart switches 114, 116 are located along a flexible arm 118 that is fixed to the base 22 and extends angularly upwardly toward the touch screen display 24. The two spaced apart switches 114, 116 are located at positions along the flexible arm 118 for actuation by the protrusions 110, 112, respectively. When a force is applied by, for example, a user pressing on the touch screen display 24, the touch screen display 24 is displaced and the protrusion 112 depresses the switch 116. When a second force is applied to the touch screen display 24 while the first force is still applied, the touch screen display 24 is further displaced as it pivots against the display stop 89 and the arm 118 flexes such that the other protrusion 110 contacts and depresses the other switch 114. Thus, both switches 114, 116 are depressed. When the applied forces are removed by, for example, the user lifting fingers off of the touch screen display 24, the touch screen display 24 returns to the original position and the flexible arm 118 and switches 114, 116, which in the present embodiment are dome-type switches, return to the positions shown in FIG. 8.

Figure 9:
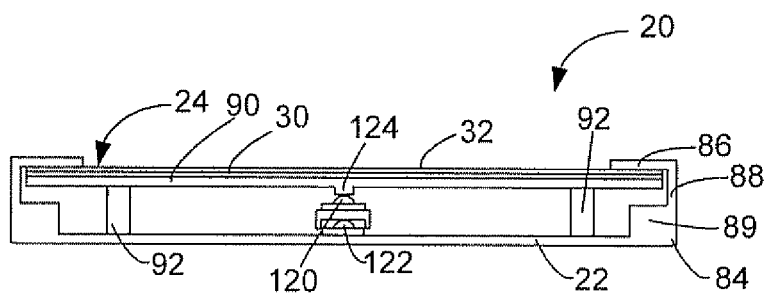
FIG. 9 is a simplified sectional side view of the portable electronic device according to yet another embodiment (not to scale)

Referring now to FIG. 9, yet another embodiment of the present application is shown. As in the embodiments described with reference to FIGS. 8 and 9, there is no actuator between the base 22 and the touch screen display 24. Instead, in the present embodiment, there are two switches 120, 122, with a first switch 120 stacked on a second switch 122. The second switch 122 is disposed on the base 22 and requires a greater applied force to depress and thereby actuate than the first switch 120. A single protrusion 124 extends from the display support 90 in the direction of the base 22 and is in contact with the first switch 120. When a force is applied by, for example, a user pressing on the touch screen display 24, the touch screen display 24 is displaced and the displacement of the protrusion 124 causes depression of the first switch 120. The first switch 120 is depressed rather than the second switch 122 as the second switch 122 requires a greater applied force to depress. When a second force is applied to the touch screen display 24 while the first force is still applied, the touch screen display 24 is further displaced as it pivots against the display stop 89 and further displacement of the protrusion 124 causes depression of the second switch 122. Thus, both switches 122, 124 are depressed. When the applied forces are removed by, for example, the user lifting fingers off of the touch screen display 24, the touch screen display 24 returns to the original position in which the touch screen display 24 is biased away from the base 22, against the frame 86. The switches 120, 122 which, in the present embodiment, are dome-type switches, also return to the positions shown in FIG. 9.

Figure 10:
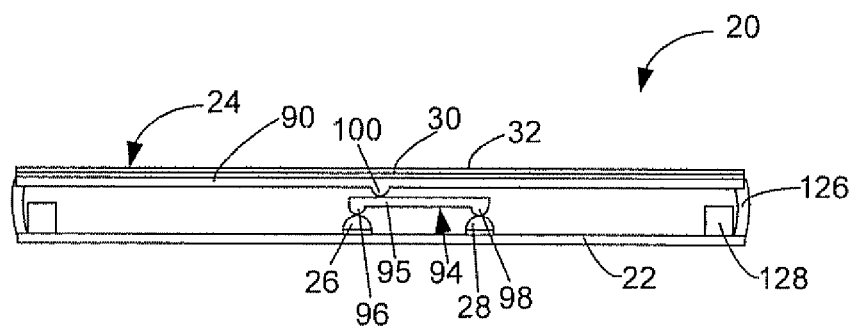
FIG. 10 is a simplified sectional side view of a portable electronic device according to still another embodiment (not to scale)
Figure 11:
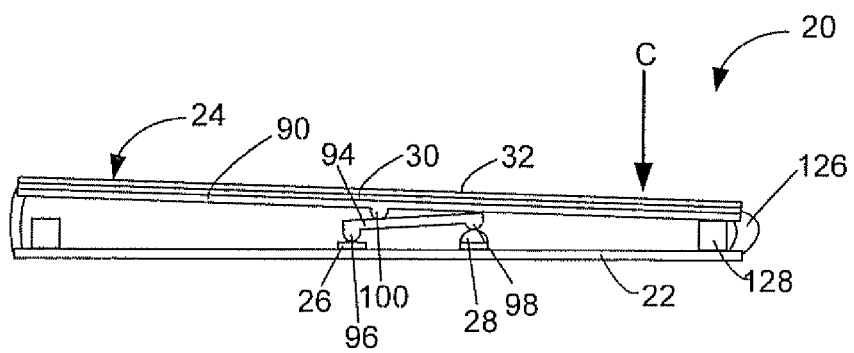
FIG. 11 is a simplified sectional side view of the portable electronic device of FIG. 10 (not to scale), showing a force applied to a location on the touch screen display.

The above-described embodiments are provided for exemplary purposes. Many of the features as described can vary while still performing the same functions. Referring now to FIGS. 10 and 11, there is shown another embodiment of a portable electronic device in which the base 22 is connected to the touch screen display 24 by flexible sidewalls 126 extending between and connected to the base 22 and the touch screen display 24.

Again, the base 22 includes a plate (not shown) that is releasably attached for insertion and removal of, for example, the battery 68 and the SIM card 62 described above. The flexible sidewalls 126 can be made from any suitable flexible material such as any suitable elastomer. It will again be appreciated that the touch screen display 24 includes an assembly of components including the touch sensitive input surface 32 overlying the LCD display device 30 and other components including optional components such as a backlight, supported by, for example, an edge support and by the rigid display support 90. Again, the touch screen display 24 is supported by the rigid display support 90 to provide structural support to the touch screen display 24 and inhibit bending causing damage or breaking of the touch screen display 24. The flexible sidewalls 126 are connected between the touch screen display 24 and the base 22 by, for example, a mechanical interlock with the display support 90 and a mechanical interlock with the base 22. Such a mechanical interlock can be formed, for example, by mechanically trapping the flexible sidewalls 126 during assembly of the touch screen display 24 with the display support 90 or can be overmolded. As in the above-described embodiments, the touch screen display 24 is movable with respect to the base 22. In the exemplary embodiment shown, the mechanical display support 90 includes a protrusion 100, similar to the protrusion described above with reference to the embodiment shown in FIG. 2. Further, the protrusion contacts an actuator 94 that has projections 96, 98 for depressing respective switches 26, 28, when a force is applied to the touch screen display 24, such as the exemplary force in the direction of the arrow "C" shown in FIG. 11.

In the present embodiment, the flexible sidewalls 126 are continuous and extend around the periphery of the touch screen display 24, for providing a dust shield for the components housed between the base 22 and the touch screen display 24. The sidewalls 126 flex when a force is applied to the screen to allow depression of the mechanical switches 26, 28 by the actuator 94, and also act to bias the touch screen display 24 into a position in which the switches 26, 28 are not actuated. Display stops 128 are disposed on the base 22 to limit the distance of travel of the touch screen display 24 in the direction of the base 22. It will be appreciated that the display stops 128 can take many different forms while still providing the same function.

The functions of the mechanical switches 26, 28, the actuator 94, projections 96, 98 and protrusion 100 are similar to those already described above with reference to FIGS. 2 to 6.

The mechanical switches 26, 28 and the touch screen display 24 that is moveable with respect to the base 22 provides the user with a desirable tactile feedback. As indicated above, when selecting a sequence of multiple virtual buttons on the touch screen display 24, depression of the touch screen display 24 with, for example, a thumb to select one button may occur prior to lifting the opposite thumb from selection of a previous button on the touch screen display 24. Thus, there is an overlap in time during which both thumbs contact and depress the touch screen display 24. The pair of switches 26, 28 provide the user with tactile feedback when depressing the touch screen display to select a button even when the touch screen display 24 is still depressed from selection of a previous button. Further, tactile feedback can be provided when lifting either or both thumbs from the touch screen display 24.

Thus, according to one aspect there is provided an electronic device that includes a base, a touch screen display, a pair of switches and operational components. The touch screen display is connected to the base, movable relative thereto and includes a display device and a touch-sensitive input surface overlying the display device. The switches are disposed between the base and the touch screen display and configured such that one of the switches is actuated in response to application of a force anywhere on the touch-sensitive input surface of the touch screen display and both of the switches are actuated in response to application of more than one force on the touch-sensitive input surface of the touch screen display. Operational components include a controller connected to the touch-sensitive input surface and a processor connected to the controller and the touch screen display.

According to another aspect, the touch screen display comprises a display support for providing mechanical support to the display device and touch-sensitive input surface with the display device and the touch-sensitive input surface disposed on the display support.

According to another aspect, an actuator is disposed between the touch screen display and the base and extends between the pair of switches for actuating the one switch in response to application of the force on the touch-sensitive input surface of the touch screen display and actuating both switches in response to application of more than one force on the touch-sensitive input surface of the touch screen display. The display support can include at least one projection extending towards the base for contacting the actuator to actuate the switches. Also, the actuator can include a projection extending toward the display support for contacting the touch screen display support to actuate the switches. The actuator can be a beam extending between the pair of switches.

According to another aspect, a stop is provided between the base and the touch screen display for limiting the travel of the display toward the base. The stop can include a step projecting from the base, proximal outer edges of the touch screen display. The stop limits the travel distance of the display to allow a single switch to click to be actuated when a single force is applied to the touch screen display while still allowing a second switch to be actuated when a second force is applied to the touch screen display while the first force is maintained.

According to another aspect, the pair of switches are located on an arm extending from the base. The arm can be flexible and one of the pair of switches can be located closer to the touch screen display than an other of the pair of switches.

According to still another aspect, the switches are located such that one of the pair of switches is disposed between an other of the pair of switches and the touch screen display. A minimum force can be required to actuate one of the pair of switches that is less than a minimum force required to actuate an other of the pair of switches.

According to another aspect, the one of the switches is located closer to the touch screen display than an other of the switches and the one of the switches includes an over-travel to allow for further depression after actuation.

According to yet another aspect, the switches are dome-type switches.

According to one aspect, there is provided a touch screen display that includes a base, a display device connected to the base and movable relative thereto, a touch-sensitive input surface overlying the display device, and a pair of switches disposed between the base and the display device and configured such that one of the switches is actuated in response to application of a force anywhere on the touch-sensitive input surface and both of the switches are actuated in response to application of more than one force on the touch-sensitive input surface.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Further, rather than a flexible arm, as described with reference to FIG. 8, a flexible actuator can be employed or a flexible protrusion or protrusions. Many other modifications and variations may occur to those skilled in the art. All such modifications and variations are believed to be within the sphere and scope of the present application.

What is claimed is:

1. An electronic device comprising:
   a base;
   a touch screen display movable relative to the base, the touch screen display including a display and a touch-sensitive overlay overlying the display;
   first and second switches disposed between the base and the display;
   wherein, without actuating the second switch, the first switch is actuated in response to application, anywhere on the touch-sensitive overlay, of a first force causing a first pivoting action of the touch-sensitive overlay and the display relative to the base;
   wherein the second switch is actuated in response to application, on the touch-sensitive overlay during application of the first force, of a second force causing a second pivoting action of the touch-sensitive overlay and display relative to the base.

2. The electronic device according to claim 1, wherein the touch screen display comprises a display support for providing mechanical support to the display and touch-sensitive overlay, the display and the touch-sensitive overlay disposed on the display support.

3. The electronic device according to claim 2, comprising an actuator disposed between the touch screen display and the base and extending between the first and second switches for actuating the first switch and without actuating the second switch in response to application of the first force and actuating the second switch in response to application of the second force.

4. The electronic device according to claim 3, wherein the actuator comprises a beam extending between the first and second switches.

5. The electronic device according to claim 3, wherein the one of the first and second switches is located closer to a center of touch screen display than another of the first and second switches.

6. The electronic device according to claim 3, wherein the display support comprises at least one projection proximal a center of the display support and extending towards the base for contacting the actuator for actuating the first and second switches.

7. The electronic device according to claim 3, wherein the actuator comprises a projection extending towards the display support for contacting with the display support, proximal a center thereof for actuating the first and second switches.

8. The electronic device according to claim 1, comprising a display stop between the base and the touch screen display for limiting the travel of the touch screen display toward the base.

9. The electronic device according to claim 8, wherein the display stop comprises a step projecting from the base, proximal outer edges of the touch screen display.

10. The electronic device according to claim 1, wherein the first and second switches are mounted on an arm extending from the base.

11. The electronic device according to claim 10, wherein the arm is flexible.

12. The electronic device according to claim 11, wherein the arm is configured such that one of the first and second switches is located closer to the touch screen display than another of the first and second switches.

13. The electronic device according to claim 1, wherein the first and second switches are located such that one of the first and second switches is disposed between another of the first and second switches and the touch screen display.

14. The electronic device according to claim 1, wherein a minimum force required to actuate one of the first and second switches is less than a minimum force required to actuate another of the first and second switches.

15. The electronic device according to claim 1, wherein the one of the first and second switches is located closer to the touch screen display the another of the first and second switches.

16. The electronic device according to claim 1, wherein the one of the first and second switches includes an over-travel to allow for further depression after actuation.

17. The electronic device according to claim 1, wherein the first and second switches are mechanical switches.

18. The electronic device according to claim 1, wherein the first and second switches are dome-type switches.

19. The electronic device according to claim 1, comprising at least one biasing element for biasing the touch screen display away from the first and second switches.

20. The electronic device according to claim 1, wherein an electrical signal is generated in response to actuation of any of the first and second switches and wherein the electrical signal is received at the processor as a further input in addition to input from the touch screen display.

21. The electronic device according to claim 1, comprising sidewalls and a frame framing the touch screen display and connected to the base by the sidewalls.

22. The electronic device according to claim 1, comprising flexible sidewalls extending between the base and the touch screen display.

23. The electronic device according to claim 22, wherein the flexible sidewalls are continuous and extend around the periphery of the touch screen display.

24. The electronic device of claim 1, wherein the first force is applied at a first location on the touch-sensitive overlay and the second force is applied at a second location on the touch-sensitive overlay.

25. The electronic device of claim 1, wherein the second pivoting action is in a direction different from the first pivoting action.

26. A touch screen display comprising:
   a base;
   a display movable relative to the base;
   a touch-sensitive overlay overlying the display;
   first and second switches disposed between the base and the display;
   wherein the first switch is actuated in response to application, at a first location anywhere on the touch-sensitive overlay, of a first force causing a first pivoting action of the touch-sensitive overlay and the display relative to the base without actuating the second switch,
   wherein the second switch is actuated in response to application on the touch-sensitive overlay during application of the first force, of a second force causing a second pivoting action of the touch-sensitive overlay and display relative to the base;
   a controller coupled to the touch-sensitive overlay.

27. The touch screen display of claim 26, wherein the first force is applied at a first location on the touch-sensitive overlay and the second force is applied at a second location on the touch-sensitive overlay.

28. The touch screen display of claim 26, wherein the second pivoting action is in a direction different from the first pivoting action.

* * * * *